July 25, 1961
G. B. PACKARD
2,993,651
WATER SPRAYING DEVICE PROVIDING A CONTROLLED
PROPORTION OF A CHEMICAL IN WATER
Filed Oct. 14, 1959
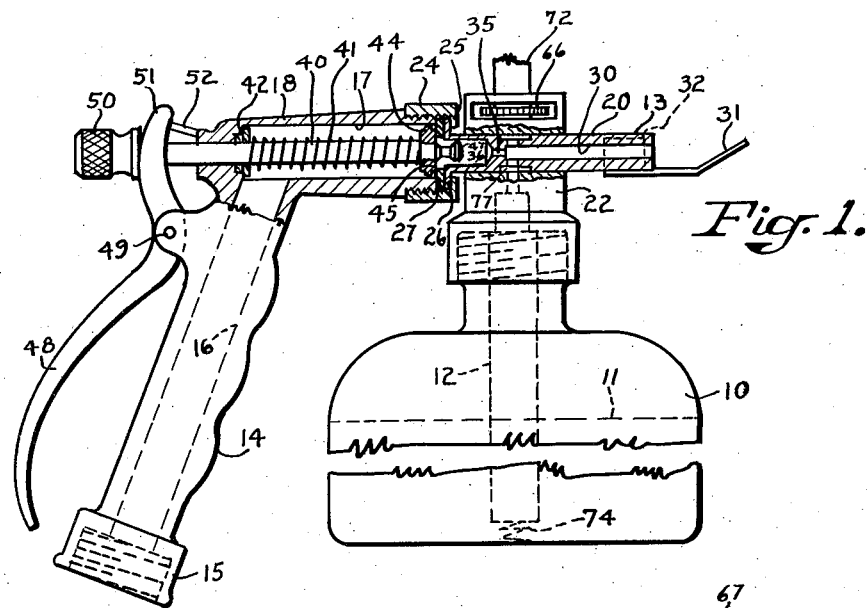
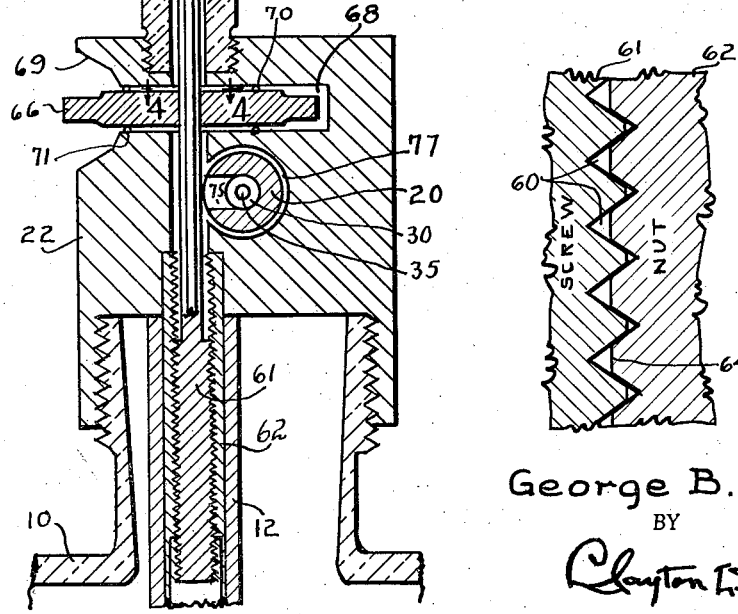
INVENTOR.
George B. Packard
BY
Clayton L. Jenks
ATTORNEY

2,993,651
Patented July 25, 1961

2,993,651
WATER SPRAYING DEVICE PROVIDING A CONTROLLED PROPORTION OF A CHEMICAL IN WATER
George B. Packard, Shrewsbury, Mass., assignor to Barco Manufacturing Co., Inc., Worcester, Mass., a corporation of Massachusetts
Filed Oct. 14, 1959, Ser. No. 846,362
2 Claims. (Cl. 239—318)

This invention relates to a fluid spraying device, and more particularly to a device for spraying water under pressure which serves to aspirate a second fluid from a container for intermixture therewith.

A spraying device of this type comprises a container for a chemical, a fungicide, an insecticide or other suitabl water-soluble active ingredient which is to be sprayed in a given territory. Water is led under pressure from a suitable hose pipe and passed through a constricted passage in an injector nozzle so constructed that the water stream creates a vacuum and draws fluid from the container for mingling with the water. Many of the spray ingredients are powerful chemicals which, if used in the proper proportions, will give beneficial results, but otherwise might do serious harm to the vegetation that is being covered. Also, if an insecticide is to be delivered, it is required that the spray have the proper dilution adequate for killing the insects but without hurting the plants. Hence, it is often required that the chemical be metered fairly accurately relative to the quantity of water that is to be sprayed so that, for example, a teaspoonful of the chemical may be intermingled and sprayed with a desired number of gallons of the water.

A primary object of this invention is to satisfy this requirement and provide a metering device which will proportion the active ingredient and water with sufficient accuracy to insure proper treatment of the plants, for example, that are to be sprayed.

It is a further object to provide a metering device which may be readily regulated to vary the quantity of a fluid delivered under pressure.

A further object is to provide a metering device which will deliver all proportions of two fluid ingredients between maximum and minimum amounts and which may be readily regulated by the mere movement of a manually operable control member. Other objects will be apparent in the following disclosure.

In accordance with this invention a fluid is metered by means of a screw thread providing a passage which frictionally resists the fluid flow and wherein that flow may be varied by varying the length of the thread passage.

Referring to the drawings illustrating one embodiment of the invention:

FIG. 1 is an elevation partly broken away of a spraying device having an injector action pressure device for removing fluid from a container and from which the flow of fluid is metered by a screw thread passage;

FIG. 2 is an enlarged vertical section of a portion of the container, the screw thread metering device and the finger operated adjustment control member which regulates the quantity of fluid delivered;

FIG. 3 is a diagrammatic view of a few of the threads showing the relationship of the screw and nut which provide the metering passage; and FIG. 4 is a fragmentary view taken on the line 4—4 of FIG. 2.

Referring first to FIG. 1, the container 10 adapted to contain a suitable aqueous soluble chemical 11 has its fluid educted through an outlet tube 12 carrying the metering device and then is drawn into the spray nozzle 13 where it is mixed with water. The water is supplied for that purpose through a suitable handle structure 14 having an internally threaded cap 15 to which a standard hose pipe may be suitably connected. The water is led through the internal passage 16 of that handle and into a valve chamber 17 within a cylindrical body 18. From this passage the water is forced by the hydraulic pressure through an injector having a venturi shaped passage which provides a partial vacuum for aspirating the fluid from the container. This may comprise a cylindrical tube 20 fitted within a suitably shaped cylindrical opening within a housing 22. To hold the parts assembled, the valve body 18 may have an external thread on a reduced end portion, and a cap 24 having an inwardly depending flange 25 is threaded on that body 18. The flange of the cap engages radial flange 26 formed on the inner end of the tube 20. A suitable washer 27 may be inserted between the flange 26 and the end of the body 18 to prevent the leakage of water. The nozzle 20 has an internal bore 30 arranged axially thereof. Various provisions may be employed to insure the formation of a spray of the fluid issuing from that bore 30. As shown, this may comprise a suitably shaped water deflecting baffle 31 located in the path of the stream issuing from the bore 30 and suitably held in place by means of a spring clip 32 surrounding the nozzle 20.

The construction of the injector which provides the vacuum for withdrawing fluid from the container 10 may be as desired. As shown, it comprises a small bore passage 35 which leads into the larger diameter passage 30 of the nozzle. At the left of that small bore passage 35 is a larger entrance passage 36 communicating with the still larger bore 17 of the body 18. It will be understood that the high velocity stream of water issuing through the small bore passage 35 creates a vacuum at the near end of the chamber 30, and this vacuum is employed to cause fluid to be lifted from the container 10 through the vertical tube 12.

Various valve constructions may be employed to control the flow of water from the hose pipe through the injector device. As shown, it comprises a valve stem 40 urged inwardly toward a closed position by means of a helical compression spring 41 engaging at one end a suitable washer 42 at the left hand end of the passage 17 which prevents fluid leakage outwardly along the valve stem. At the other end, the spring bears against the valve member 44 suitably mounted on the stem 40. This member 44, which may be substantially rectangular in cross section, has an annular seat 45 adapted to bear against the elastic washer 27 and press it against the outer flat face of the flange 26 to prevent the flow of water when the valve plunger 44 rests thereagainst. The stem 40 may terminate in an inner deflector 47 of suitable characteristics which serves both as a guide for the stem and to provide a proper distribution of the water for its entrance into the constricted passage 35. A handle 48 pivoted to the outer side of the casing 14 at 49 bears against a cap 50 threaded on the outer end of the valve stem 40 so that by manually pressing down on the handle 48 the short end 51 of the handle lever will serve to remove the valve 44 from adjacent its washer seat 46 and permit the flow of water. A pivoted stop 52 of suitable shape may be interposed to prevent the valve from closing, or the operator may hold down on the handle during the entire time while the spray is desired. Various other constructions may be employed for controlling the water flow and for providing the injector action to insure withdrawing the fluid from the container 10.

In accordance with this invention, a fluid flow is metered by its being required to pass upwardly between the threads of a loose screw and nut. The fluid is preferably transmitted through a helical passage 60 (as shown diagrammatically in FIG. 3) at the apex of the threads of a screw 61 threaded into a nut 62. This passage may be made accurate in size by truncating a thread, as by reaming off an outer portion of the threads of the nut, as indicated by the line 64 in FIG. 3. This provides a passage of a definite or substantially uniform cross section. The threads of the nut and the screw may touch otherwise with the usual accuracy. The fluid flow is regulated adequately by varying the length of the helical passage 60 between the nut and the screw; that is, the volume of flow is dependent upon the frictional resistance to the flow as produced by the walls of the helical passage. Hence, the volume regulation is determined in this embodiment by threading the screw 61 through the nut 62 to a greater or lesser degree. When the threads are mated to the full extent, this provides the minimum of fluid flow, and the device may be calibrated so that for a given position of the end of the screw relative to the nut the fluid flow may be controlled.

A suitable construction for this regulation of fluid flow is shown in FIG. 2 wherein the screw 61 is adjustably moved vertically through the nut 62 which is fixedly mounted in the housing 22. The screw is turned by means of a finger operated disk 66 which is slidably keyed to a stem 67 connected to the screw 61 in axial alignment. In the construction shown, the stem 67 is made octagonal in cross section, and the disk 66 has a similarly shaped keying opening, so that the stem may slide therethrough but is required to turn the screw as one turns the regulating disk 66. This disk is mounted in a horizontal slot 68 located near the top of the container cap 22, and the cap is suitably recessed at 69 to provide easy access to the periphery of the disk 66.

Since the suction effect is transmitted around the screw stem 67, the rotary disk 66 has two O-rings 70 and 71 suitably mounted between it and the upper and lower sides of the slot to prevent leakage at that point. The upper end of the stem 67 is mounted in a hollow housing or cap 72 which is suitably threaded into or otherwise connected into the top of the body 22. The upper part of this cap is closed, so that it is suitably sealed against air leakage to insure that the vacuum in the container 10 is not destroyed. The cap 72 is made of a transparent material, such as a vinyl plastic, so that the position of the top of the stem 67 may be readily seen. The cap is provided with markings 73, shown as annular grooves which may be identified by suitable indicia, so that the quantity of fluid flow per unit of water may be determined by observing the position of the top of the stem 67 relative to the markings 73. The bottom of the tube 12 is located near the bottom of the container 10, and if desired, a helical wire 74 may be mounted at its lower end, or any other suitable filter construction may be used to prevent the ingress of foreign matter into the tube 12.

It will be observed by reference to FIGS. 1 and 2, which are views taken at 90° to each other, that the passage 30 wherein the vacuum is formed connects through a side passage 75 with the space within a vertical bore in the cap 22 and the helical passage 60 leads thereto, so that the fluid is forced upwardly from the container into the water stream in the nozzle. The bore communicates, as above indicated, with the space at the center of the rotary governing disk 66, but the O-rings 70 and 71 and the enclosing cap 72 prevent breaking the vacuum at this point. The lateral passage 75 preferably communicates with an annular groove 77, FIG. 2, which is so arranged that whatever may be the position of assembly of the tube 20, the container tube 12 will be properly connected to the ejection bore 30 of the spray nozzle. It will be observed (FIG. 2) that the fluid regulating screw is located near the top of the housing 22. The neck of the container 10 is threaded into a recess on the under side of the housing 22, and if the leakage of air through that thread is not adequate for the purpose, then a small vent hole may be provided to allow the ingress of air into the container as the fluid is removed by the suction of the spray device.

In accordance with this invention, I have provided a metering device having a helical passage of variable length which frictionally resists fluid flow and in proportion to the length of the passage serves to regulate the flow of fluid from an inlet to an outlet pipe. The passage is preferably formed between a nut and screw by truncating the thread of one of the parts to provide a passage of a definite cross section. The nut may be fixed relative to the pipe and the screw rotatably mounted therein. To provide a ready manual control of the length of the helical passage, the screw is preferably fixed to a stem which is keyed within and movable through a manually turnable disk so as to project from the nut by a variable distance. The relative lengths of the nut and screw are such as to provide a maximum passage length and a minimum flow when the two are fully engaged. The space within tube 12 within which the screw projects downwardly is long enough so that nearly all of the screw may be threaded out of the nut. Similarly, when the screw is fully meshed within the nut, the stem is at its uppermost position in the housing 72 which is proportioned for the purpose. A sealing means is provided to prevent the access of air or loss of fluid at the keyed connection of the stem with the rotatable disk.

It will be appreciated that the injector above described is an hydraulic pump and that various other forms of pump mechanism may be provided to move the fluid from the inlet pipe, such as pipe 12, to the outlet pipe, such as the nozzle passage 30. In the hydraulic device illustrated, the injector pump provides a partial vacuum and the pressure of air on the fluid in the container thus lifts the fluid to the outlet pipe. Moreover, although the metering device has been shown in association with a spray bottle arranged to carry and supply a second fluid to a primary fluid stream, it will be understood that the metering device may be employed to control the volume of flow of a single fluid where accuracy of measurement is desirable.

It will, therefore, be appreciated that the above disclosure of a preferred embodiment of this invention is not to be interpreted as imposing limitations on the appended claims.

I claim:

1. A spraying apparatus comprising a conduit for water under pressure, a head, a spray nozzle thereon having an exit from a flow chamber, said head having a narrow orifice between said chamber exit and conduit arranged to provide a zone of a partial vacuum, a container for a fluid to be mixed with the water, a pipe for leading said fluid from the container to said zone, a metering device for controlling the flow of said fluid from the pipe which comprises a nut and a screw therein providing an elongated helical fluid passage communicating with the container pipe and said zone which has a substantially uniform cross section, the screw being mounted for projecting to a variable extent from the nut so that the length of the passage may be varied according to the position of the screw, said head having an elongated hole therethrough which is aligned with the screw axis and a lateral slot intersecting said hole, a stem in said hole movable with the screw and projecting through the lateral slot and from the head, a transparent cap secured to the head which encloses the projecting portion of the stem but permits observation of the stem position, a rotary member slidably keyed to the stem and projecting outwardly from the lateral slot for manual manipulation, and sealing rings around the stem on the opposite sides of the rotary member which prevent the passage of air through the slot to said hole.

2. A spraying apparatus comprising a conduit for water under pressure, a container for a fluid to be mixed with said water, a head removably mounted as a closure on the container, said head having a transverse Venturi shaped passage connected with said conduit, a spray nozzle on the head for delivery of water from said passage, a pipe below and carried by said head for leading fluid upwardly from said container to said Venturi passage for intermingling with the water from said conduit, said pipe having an elongated helical thread constituting a nut, an elongated screw adjustably mounted within the thread of said nut and arranged to project from the nut to an adjustable extent, said screw and nut forming a fluid passage of substantially uniform cross section and an adjustable length as determined by the longitudinal adjustment of the screw within and its projection from the nut, said head having a vertical hole axially aligned with the screw and a lateral communication therefrom to the Venturi passage, a stem connected to the screw for turning the same which passes freely upwardly through said vertical hole, an externally accessible rotary member connected to turn the stem and adjust the position of the screw within the nut, and means providing a fluid seal which prevents the passage of fluid around the stem above said lateral communication.

References Cited in the file of this patent

UNITED STATES PATENTS

| | | |
|---|---|---|
| 1,899,698 | Klein | Feb. 28, 1933 |
| 2,260,603 | Budwig | Oct. 28, 1941 |
| 2,310,633 | Heimburger | Feb. 9, 1943 |
| 2,391,583 | Martin | Dec. 25, 1945 |
| 2,617,686 | Baron | Nov. 11, 1952 |
| 2,752,201 | Blass | June 26, 1956 |
| 2,788,244 | Gilmour | Apr. 9, 1957 |

FOREIGN PATENTS

| | | |
|---|---|---|
| 684,986 | Great Britain | Dec. 31, 1952 |